United States Patent
Yang et al.

(10) Patent No.: US 9,513,674 B2
(45) Date of Patent: Dec. 6, 2016

(54) ROTARY FLAP DOOR DEVICE AND ELECTRONIC DEVICE THEREWITH

(71) Applicants: Inventec (Pudong) Technology Corp., Shanghai (CN); Inventec Corporation, Taipei (TW)

(72) Inventors: Yuan-Chang Yang, Taipei (TW); Shih-Wei Chen, Taipei (TW); Shih-Cheng Yeh, Taipei (TW); Chih-Wei Chiang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 104 days.

(21) Appl. No.: 14/673,891

(22) Filed: Mar. 31, 2015

(65) Prior Publication Data

US 2016/0157369 A1 Jun. 2, 2016

(30) Foreign Application Priority Data

Nov. 27, 2014 (CN) .......................... 2014 1 0709814

(51) Int. Cl.
  *G06F 1/18* (2006.01)
  *G11B 33/02* (2006.01)
  *G11B 17/04* (2006.01)
(52) U.S. Cl.
  CPC ............. *G06F 1/18* (2013.01); *G11B 17/0405* (2013.01); *G11B 33/022* (2013.01); *G11B 33/027* (2013.01)
(58) Field of Classification Search
  CPC  G06F 1/1601–1/1611; G06F 1/1613–1/1698; G06F 1/18–1/189; H05K 5/00–5/069; H05K 7/00–7/186; G11B 17/0405; G11B 33/022; G11B 33/027

USPC ............. 361/679.01–679.45, 679.55–679.61, 361/724–727, 756, 741, 686, 687, 688, 696, 361/697, 787, 789, 794, 701–703, 709, 361/807–810
See application file for complete search history.

(56) References Cited

U.S. PATENT DOCUMENTS

| | | | | |
|---|---|---|---|---|
| 6,896,612 | B1* | 5/2005 | Novotny | H05K 7/20618 361/691 |
| 2008/0239668 | A1* | 10/2008 | Hendrix | H05K 7/20563 361/695 |
| 2009/0059534 | A1* | 3/2009 | Hata | H05K 5/0213 361/709 |
| 2009/0185346 | A1* | 7/2009 | Cairo | H05K 7/20127 361/692 |
| 2009/0225514 | A1* | 9/2009 | Correa | H05K 7/20781 361/701 |
| 2009/0303678 | A1* | 12/2009 | Ishimine | G06F 1/20 361/679.48 |
| 2010/0027212 | A1* | 2/2010 | Daunert Armillas | G06F 1/20 361/679.33 |
| 2010/0073863 | A1* | 3/2010 | Matsushima | H05K 7/20809 361/679.46 |

(Continued)

*Primary Examiner* — Anthony Haughton
*Assistant Examiner* — Razmeen Gafur
(74) *Attorney, Agent, or Firm* — Winston Hsu; Scott Margo (57) ABSTRACT

An electronic device includes a casing and a rotary flap door device. The rotary flap door device is installed inside the casing and includes a base plate and a door member. The base plate is mounted on the casing. A base constraining structure and a base engaging structure are formed on the base plate. The door member includes a door body, a door limit part and a door engaging portion. The door body is rotably disposed on the base plate. The door limit part extends from the door body and is for embedding into the base limit part. The door engaging portion protrudes from the door body and is for engaging with the base engaging portion.

16 Claims, 6 Drawing Sheets

(56) References Cited

U.S. PATENT DOCUMENTS

| | | | |
|---|---|---|---|
| 2010/0091449 A1* | 4/2010 | Clidaras | G06F 1/20 361/679.49 |
| 2010/0097752 A1* | 4/2010 | Doll | H05K 7/20736 361/679.48 |
| 2010/0321874 A1* | 12/2010 | Bhattacharyya | H05K 7/20736 361/679.5 |
| 2011/0069450 A1* | 3/2011 | Adducci | H05K 7/186 361/692 |
| 2011/0194244 A1* | 8/2011 | Reents | G06F 1/181 361/679.46 |
| 2011/0300815 A1* | 12/2011 | Thompson | H01L 23/36 455/90.3 |
| 2012/0155027 A1* | 6/2012 | Broome | H05K 7/1497 361/696 |
| 2012/0201003 A1* | 8/2012 | Shimasaki | H05K 7/20736 361/695 |
| 2012/0281352 A1* | 11/2012 | Namek | H05K 7/20745 361/679.46 |
| 2013/0088833 A1* | 4/2013 | Cox | H05K 7/20736 361/689 |
| 2013/0301223 A1* | 11/2013 | Nelson | H05K 7/2039 361/716 |
| 2014/0063729 A1* | 3/2014 | Claassen | H05K 7/20736 361/679.46 |
| 2014/0071621 A1* | 3/2014 | Dong | H05K 7/20727 361/692 |
| 2014/0146459 A1* | 5/2014 | Hazzard | H05K 7/1498 361/679.21 |
| 2014/0268566 A1* | 9/2014 | Dolan | H05K 7/20127 361/694 |
| 2014/0301037 A1* | 10/2014 | Best | H05K 7/20781 361/679.53 |
| 2015/0016059 A1* | 1/2015 | Esmaily | H05K 7/20736 361/695 |

* cited by examiner

ROTARY FLAP DOOR DEVICE AND ELECTRONIC DEVICE THEREWITH

BACKGROUND OF THE INVENTION

1. Field of the Invention

The present invention relates to a rotary flap door device and an electronic device therewith, and more particularly, to a rotary flap door device capable of being adapted to different data storage components by rotation and an electronic device therewith.

2. Description of the Prior Art

Generally speaking, no matter one of an industrial computer or a server computer is equipped with data storage components, such as a hard disc drive, an optical disc drive and so on. Since different data storage components have different sizes, the data storage components with different sizes cannot be arranged uniformly when being installed inside the industrial computer or inside the server computer, leading to spaces with different sizes. The spaces with different sizes will result in heat dissipating turbulence inside the industrial computer or inside the server computer, and it disadvantages in heat dissipation efficiency and causes a thermal issue inside the industrial computer or inside the server computer.

SUMMARY OF THE INVENTION

The present invention provides a rotary flap door device capable of being adapted to different data storage components by rotation for solving above drawbacks.

According to an embodiment of the present invention, a rotary flap door device installed inside a casing is disclosed. The casing is selectively equipped with a first data storage component or a second data storage component. The first data storage component has a first length, and the second data storage component has a second length greater than the first length. The rotary flap door device includes a base plate and a door member. The base plate is mounted on the casing, and a base limit part and a base engaging portion are formed on the base plate. The door member includes a door body, a door limit part and a door engaging portion. The door body is rotably disposed on the base plate, and a side of the door body is pivoted to the base plate. The door body is capable of rotating to an open position or a closed position relative to the base plate. The door limit part extends from the side of the door body, and the door limit part is embedded in the base limit part when the door body rotates to the open position, such that the door body is fixed in the open position and defines a flow channel inside the casing cooperatively with the first data storage component. The door engaging portion protrudes from a surface of the door body. The door engaging portion engages with the base engaging portion when the door body rotates to the closed position, such that the door body is fixed in the closed position and the second data storage component is adjacent to the door body.

According to another embodiment of the present invention, the base limit part is a constraining hole, the door limit part is a constraining protrusion, and the constraining protrusion is detachably embedded in the constraining hole.

According to another embodiment of the present invention, the base plate includes an opening and a passage connected with the opening and the constraining hole. A projection area of the passage is smaller than a projection area of the opening and a projection area of the constraining hole, such that a constraining block is formed between the opening and the constraining hole on the base plate, and the constraining block is for constraining the constraining protrusion in the constraining hole.

According to another embodiment of the present invention, the base engaging portion is an engaging hole, the door engaging portion is an engaging post, and the engaging post detachably inserts into the engaging hole.

According to another embodiment of the present invention, the base plate includes a pivotal axis, the door member further includes a pivotal arm extending from the door body, and the pivotal arm is pivoted to the pivotal axis.

According to another embodiment of the present invention, an escaping breach is further formed on the base plate and located near the pivotal axis, so as to provide an escaping space that allows the pivotal arm to pivot relative to the pivotal axis.

According to another embodiment of the present invention, the base limit part is a constraining hole. The pivotal arm and the door limit part are located on the same side of the door body. The pivotal arm is near the door limit part, such that the escaping breach is near the constraining hole for forming a resilient portion between the escaping breach and the constraining hole.

According to another embodiment of the present invention, the door body has a first side and a second side opposite to the first side. The pivotal arm and the door limit part protrude from the first side, and the door engaging portion is near the second side. A taking breach is formed on the base plate and located corresponding to the second side, and the second side is exposed via the taking breach.

According to another embodiment of the present invention, an electronic device includes a casing and a rotary flap door device. The casing is selectively equipped with a first data storage component or a second data storage component. The first data storage component has a first length, and the second data storage component has a second length greater than the first length. The rotary flap door device is installed inside the casing and includes a base plate and a door member. The base plate is mounted on the casing. A base limit part and a base engaging portion are formed on the base plate. The door member includes a door body, a door limit part and a door engaging portion. The door body is rotably disposed on the base plate. A side of the door body is pivoted to the base plate, and the door body is capable of rotating to an open position or a closed position relative to the base plate. The door limit part extends from the side of the door body, and the door limit part is embedded in the base limit part when the door body rotates to the open position, such that the door body is fixed in the open position and defines a flow channel inside the casing cooperatively with the first data storage component. The door engaging portion protrudes from a surface of the door body. The door engaging portion engages with the base engaging portion when the door body rotates to the closed position, such that the door body is fixed in the closed position and the second data storage component is adjacent to the door body.

In summary, when the casing is equipped with the first data storage component with the first length, the door body is rotated to the open position, meanwhile, the door limit part is embedded in the base limit part on the base plate, so as to fix the door body in the open position. As a result, the door body and the first data storage component are capable of cooperatively defining the flow channel inside the casing, such that the heat dissipating flow is concentrated to flow through the inner side of the casing via the flow channel, so as to prevent from the turbulent flow resulting from the heat dissipating flow and further to enhance heat dissipating efficiency of the electronic device. When the casing is equipped with the second data storage component with the second length, the door body is rotated to the closed position, meanwhile, the door engaging portion engages with the base engaging portion, so as to fix the door body in the closed position and to overlay the door body on the base plate. As a result, the door body does not interfere with the second data storage component and the second data storage component is adjacent to the door body, such that the heat dissipating flow generated by the thermal fan is capable of flowing through the inner side of the casing via a lateral wall of the second data storage component.

In other words, the rotary flap door device of the present invention is capable of being adapted to different data storage components by rotation, i.e. the present invention is capable of utilizing one rotary flap door device for the data storage components with different sizes, so as to save cost of molding and manufacture, and further to advantages the rotary flap door device in the market.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments maybe utilized and structural changes maybe made without departing from the scope of the present invention. Also, it is to be understood that the phraseology and terminology used herein is for the purpose of description and should not be regarded as limiting. The use of "including," "comprising," or"having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
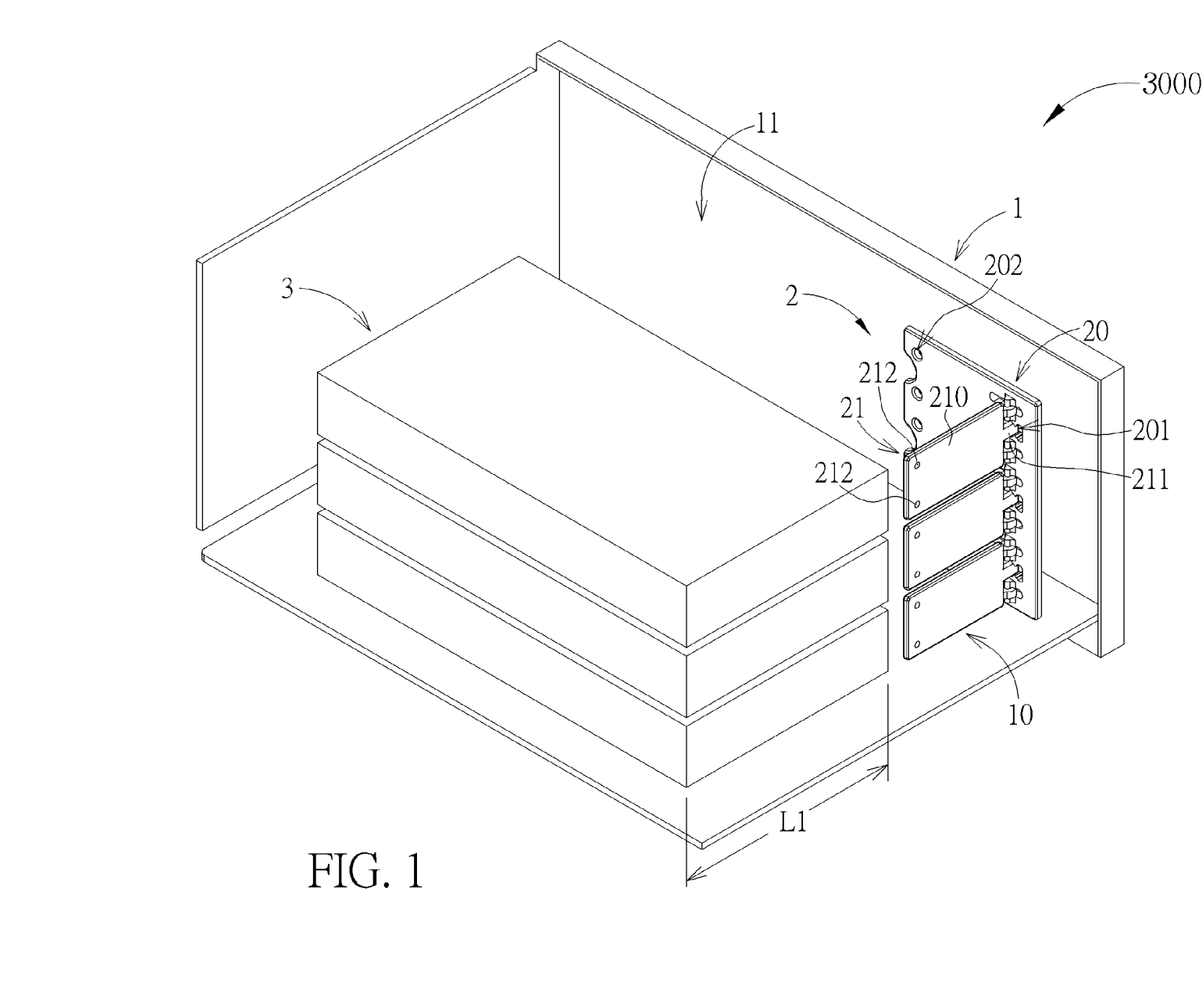
FIG. 1 is an internal diagram of an electronic device according to an embodiment of the present invention.

Please refer to FIG. 1. FIG. 1 is an internal diagram of an electronic device 3000 according to an embodiment of the present invention. As shown in FIG. 1, the electronic device 3000 includes a casing 1 and a rotary flap door device 2. The casing 1 is selectively equipped with a first data storage component 3, and the rotary flap door device 2 is installed inside the casing 1. In this embodiment, the electronic device 3000 is an industrial computer or a server computer, and the first data storage component 3 is a data storage device, such as a hard disc drive, an optical disc drive and so on, installed inside the electronic device 3000 (i.e. the industrial computer or the server computer), but the present invention is not limited thereto.

Figure 2:
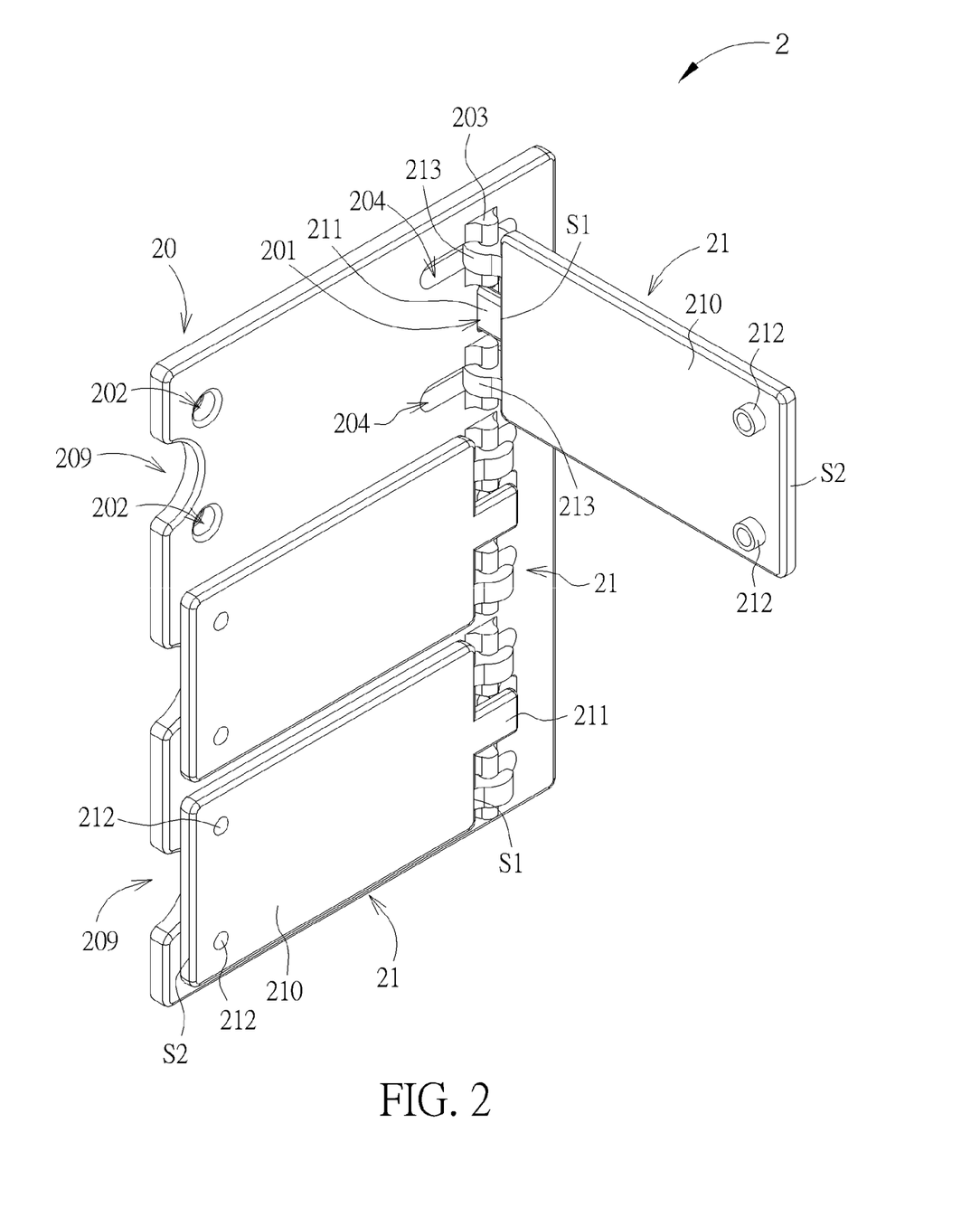
FIG. 2 is a diagram of a rotary flap door device according to the embodiment of the present invention.
Figure 3:
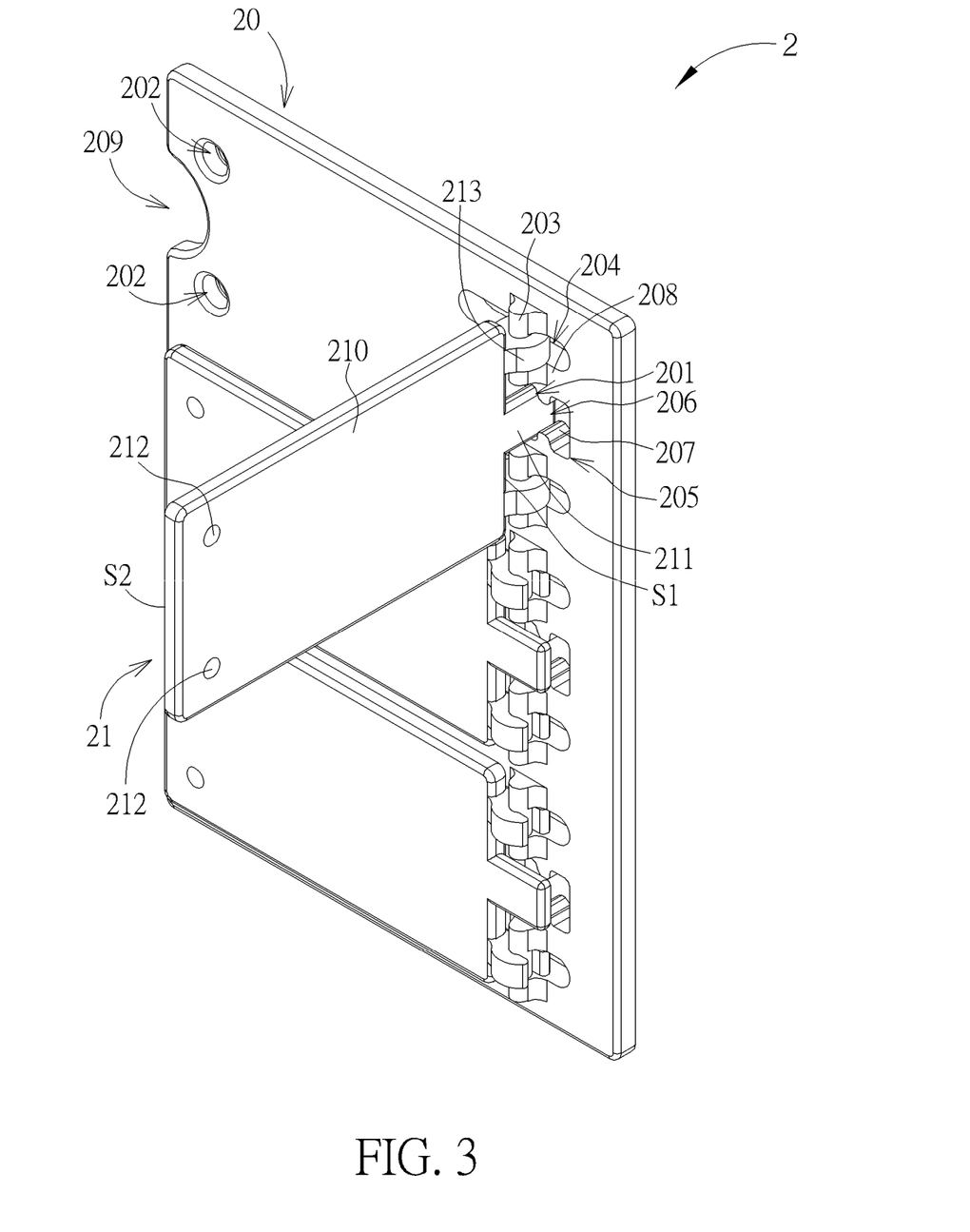
FIG. 3 is a diagram of the rotary flap door device in another view according to the embodiment of the present invention.

Please refer to FIG. 2 and FIG. 3. FIG. 2 is a diagram of the rotary flap door device 2 according to the embodiment of the present invention. FIG. 3 is a diagram of the rotary flap door device 2 in another view according to the embodiment of the present invention. As shown in FIG. 2 and FIG. 3, the rotary flap door device 2 includes a base plate 20 and three door members 21. The base plate 20 is mounted on the casing 1. Each of the door members 21 includes a door body 210, a door limit part 211, a door engaging portion 212 and two pivotal arms 213, and the base plate 20 includes a pivotal axis 203, which is located in a position corresponding to the pivotal arm 213. Furthermore, a base limit part 201 and a base engaging portion 202 are formed on the base plate 20, and the pivotal axis 203 extends from the door body 210 and is pivoted to the pivotal axis 203, such that the door body 210 is rotably disposed on the base plate 20 and is capable of rotating to an open position (as shown in FIG. 2 and FIG. 3, the door member 21 located in the top position) or to a closed position (as shown in FIG. 2 and FIG. 3, the door members 21 located in the middle position and the bottom position) relative to the base plate 20.

Furthermore, the door limit part 211 extends from the door body 210. In this embodiment, the base limit part 201 is a constraining hole, the door limit part 211 is a constraining protrusion, and the constraining protrusion (i.e. the door limit part 211) is detachably embedded in the constraining hole (i.e. the base limit part 201). When the door body 210 rotates to the open position relative, the door limit part 211 is embedded in the base limit part 201 on the base plate 20, so as to fix the door body 210 in the open position. As shown in FIG. 1 to FIG. 3, an escaping breach 204 is further formed on the base plate 20 and located near the pivotal axis 203. When the door body 210 rotates relative to the base plate 20, the pivotal arm 213 of the door member 21 is rotated with the door body 210 relative to the pivotal axis 203 of the base plate 20, meanwhile, the escaping breach 204 provides an escaping space that allows the pivotal arm 213 to pivot relative to the pivotal axis 203, so as to prevent the pivotal arm 213 from interfering with the base plate 20 as the pivotal arm 213 pivots relative to the pivotal axis 203.

Furthermore, the base plate 20 further includes an opening 205 and a passage 206 connected with the opening 205 and the constraining hole (i.e. the base limit part 201). A projection area of the passage 206 is smaller than a projection area of the opening 205 and a projection area of the constraining hole. In other words, the constraining hole and the opening 205 are located on two ends of the passage 206, and both of sizes of the constraining hole and the opening 205 are greater than a size of the passage 206, such that a constraining block 207 is formed between the opening 205 and the constraining hole on the base plate 20. When the constraining protrusion (i.e. the door limit part 211) is embedded in the constraining hole (i.e. the base limit part 201), the constraining block 207 is used for constraining the constraining protrusion in the constraining hole, so as to fix the door member 21 in the open position.

In this embodiment, the pivotal arm 213 and the door limit part 211 are located on the same side of the door body 210, and the pivotal arm 213 of the door member 21 is near the door limit part 211. Accordingly, the escaping breach 204 for providing the pivotal arm 213 with the escaping space as rotation can be near the constraining hole (i.e. the base limit part 201) for constraining the door limit part 211. In such a manner, a resilient portion 208 is formed between the escaping breach 204 and the constraining hole for allowing the constraining block 207 to deform, such that the constraining block 207 deforms when the door limit part 211 embeds in the constraining hole smoothly.

Figure 4:
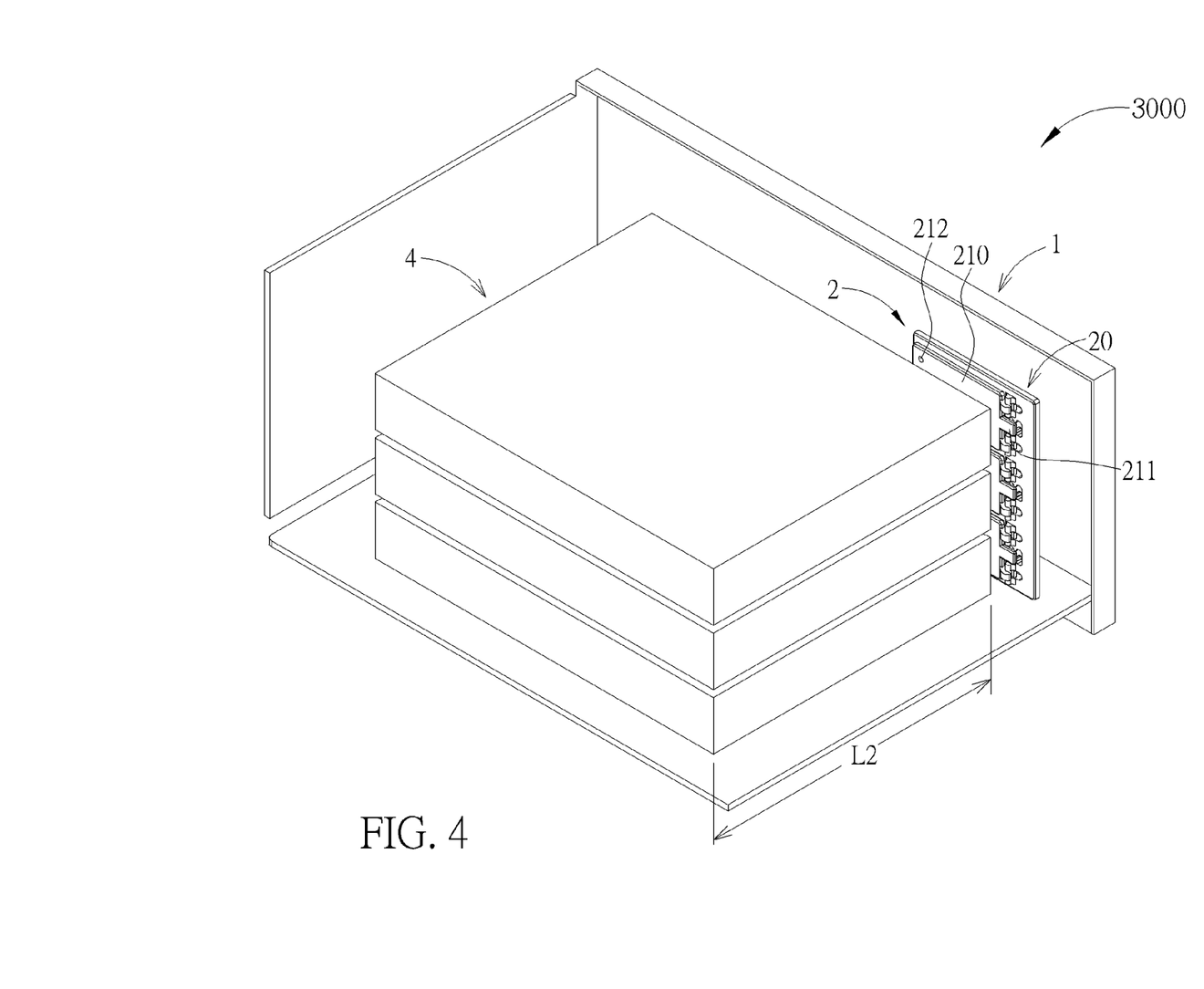
FIG. 4 is a diagram of the rotary flap door device adapted to a second data storage component according to the embodiment of the present invention.

As shown in FIG. 1 to FIG. 3, the door engaging portion 212 protrudes from the door body 210. In this embodiment, the base engaging portion 202 is an engaging hole, the door engaging portion 212 is an engaging post, and the engaging post (i.e. the door engaging portion 212) inserts into the engaging hole (i.e. the base engaging portion 202). When the door body 210 rotates to the closed position relative to the base plate 20, the door engaging portion 212 engages with the base engaging portion 202, so as to fix the door body 210 in the closed position, meanwhile, the door body 210 overlays on the base plate 20. Please refer to FIG. 1 and FIG. 4. FIG. 4 is a diagram of the rotary flap door device 2 adapted to a second data storage component 4 according to the embodiment of the present invention. The main difference between FIG. 1 and FIG. 4 is that the casing 1 in FIG. 1 is equipped with the first data storage component 3 having a first length L1, while the casing 1 in FIG. 4 is equipped with the second data storage component 4 in FIG. 4 having a second length L2, wherein the second length L2 is greater than the first length L1. In other words, the casing 1 of the present invention can be selectively equipped with the first data storage component 3 and the second data storage component 4 with different sizes.

As shown in FIG. 1, when the casing 1 is equipped with the first data storage component 3 with the first length L1, the door body 210 is rotated to the open position, meanwhile, the door limit part 211 is embedded in the base limit part 201 on the base plate 20, so as to fix the door body 210 in the open position. As a result, the door body 210 and the first data storage component 3 are capable of cooperatively defining a flow channel 10 inside the casing 1, and the door body 210 is used for masking a space 11 on the back side of the first data storage component 3, such that the space 11 does not communicate with the flow channel 10. Accordingly, a heat dissipating flow generated by a thermal fan (not shown in figures) is capable of flowing through the inner side of the casing 1 via the flow channel 10. In other words, when the casing 1 is equipped with the first data storage component 3 with the first length L1, the door body 210 is to be fixed in the open position, such that the heat dissipating flow is concentrated to flow through the inner side of the casing 1 via the flow channel 10, so as to prevent from a turbulent flow resulting from the heat dissipating flow diverges to the space 11 on the back side of the first data storage component 3, and further to enhance heat dissipating efficiency of the electronic device 3000.

As shown in FIG. 4, when the casing 1 is equipped with the second data storage component 4 with the second length L2, the door body 210 is rotated to the closed position, meanwhile, the door engaging portion 212 engages with the base engaging portion 202, so as to fix the door body 210 in the closed position and to overlay the door body 210 on the base plate 20. As a result, the door body 210 does not interfere with the second data storage component 4 and the second data storage component 4 is adjacent to the door body 210, such that the heat dissipating flow generated by the thermal fan is capable of flowing through the inner side of the casing 1 via a lateral wall of the second data storage component 4. In other words, when the casing 1 is equipped with the second data storage component 4 with the second length L2, the door body 210 is to be fixed in the closed position, such that the heat dissipating is concentrated to flow through the inner side of the casing 1 via the lateral wall of the second data storage component 4, so as to prevent from the turbulent flow resulting from the heat dissipating flow, and further to enhance heat dissipating efficiency of the electronic device 3000.

It should be noticed that the door body 210 has a first side S1 and a second side S2 opposite to the first side Si. The pivotal arm 213 and the door limit part 211 protrude from the first side S1 of the door body 210, and the door engaging portion 212 is near the second side S2 of the door body 210. A taking breach 209 is formed on the base plate 20 and located corresponding to the second side S2. The second side S2 of the door body 210 is exposed via the taking breach 209. Accordingly, when the door body 210 is fixed in the closed position, i.e. when the door body 210 overlays on the base plate 20, the second side S2 of the door body 210 can be touched via the taking breach 209 for facilitating the door body 210 to be moved from the closed position, such that the door member 21 is capable of being rotated from the closed position to the open position relative to the base plate 20.

Figure 5:
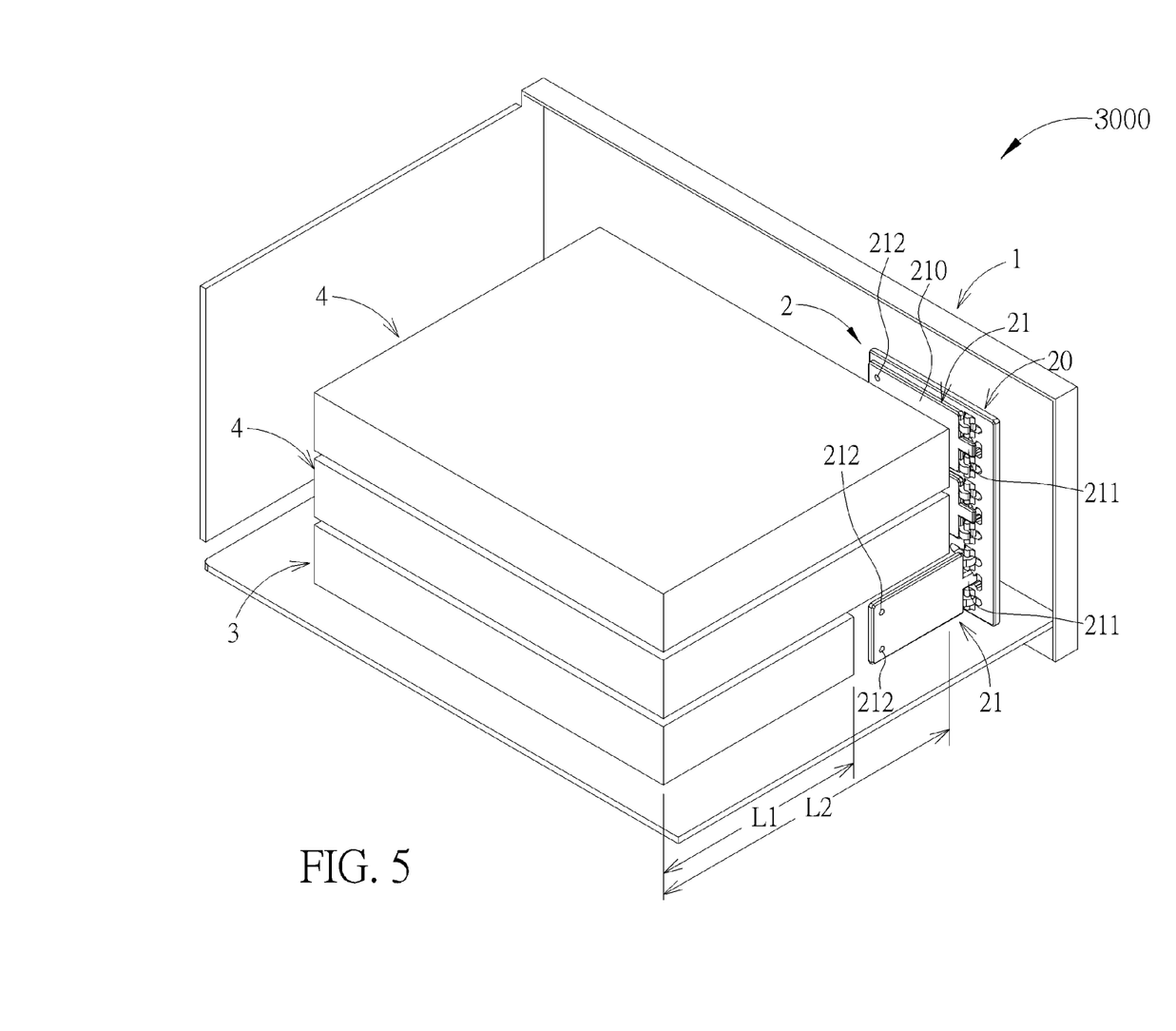
FIG. 5 and FIG. 6 are respectively diagrams of the rotary flap door device and the data storage components according to another embodiment of the present invention.
Figure 6:
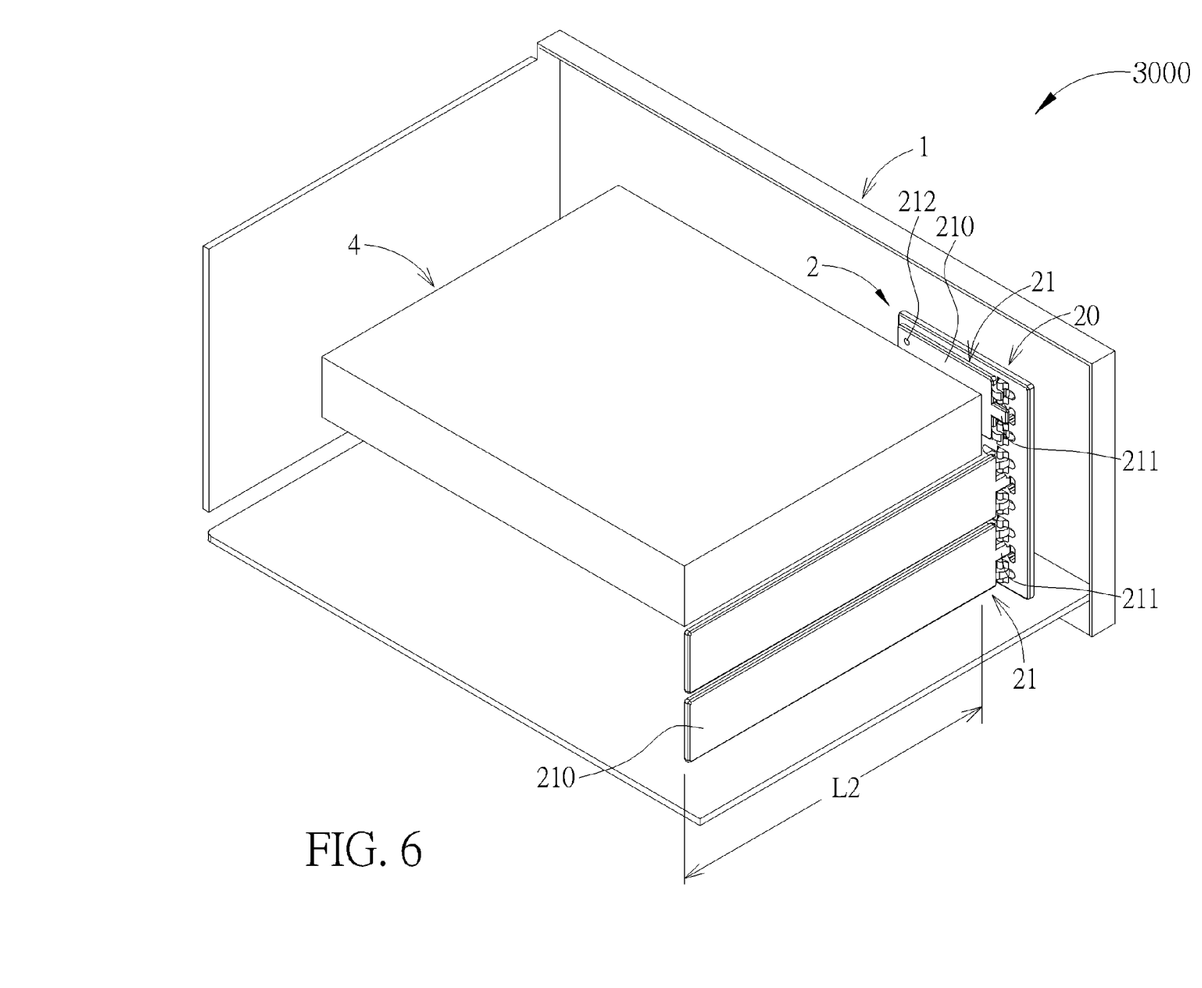

In addition, disposals of the rotary flap door device 2 and the data storage component are not limited to those illustrated in figures in this embodiment. For example, please refer to FIG. 5 and FIG. 6. FIG. 5 and FIG. 6 are respectively diagrams of the rotary flap door device 2 and the data storage components according to another embodiment of the present invention. As shown in FIG. 5, the rotary flap door device 2 is adapted for the casing 1 equipped with two second data storage components 4 and one first data storage component 3. As shown in FIG. 6, the rotary flap door device 2 is adapted for the casing 1 equipped with only one second data storage component 4. In other words, disposals of the rotary flap door device 2 and the data storage component depend on practical demands. Components with denoted in this embodiment identical to those in the aforesaid embodiment have identical structures and functions, and further description is omitted herein for simplicity.

Compared to the prior art, when the casing is equipped with the first data storage component with the first length, the door body is rotated to the open position, meanwhile, the door limit part is embedded in the base limit part on the base plate, so as to fix the door body in the open position. As a result, the door body and the first data storage component are capable of cooperatively defining the flow channel inside the casing, such that the heat dissipating flow is concentrated to flow through the inner side of the casing via the flow channel, so as to prevent from the turbulent flow resulting from the heat dissipating flow and further to enhance heat dissipating efficiency of the electronic device. When the casing is equipped with the second data storage component with the second length, the door body is rotated to the closed position, meanwhile, the door engaging portion engages with the base engaging portion, so as to fix the door body in the closed position and to overlay the door body on the base plate. As a result, the door body does not interfere with the second data storage component and the second data storage component is adjacent to the door body, such that the heat dissipating flow generated by the thermal fan is capable of flowing through the inner side of the casing via a lateral wall of the second data storage component.

In other words, the rotary flap door device of the present invention is capable of being adapted to different data storage components by rotation, i.e. the present invention is capable of utilizing one rotary flap door device for the data storage components with different sizes, so as to save cost of molding and manufacture, and further to advantages the rotary flap door device in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotary flap door device installed inside a casing, the casing being selectively equipped with a first data storage component or a second data storage component, the first data storage component having a first length, the second data storage component having a second length greater than the first length, the rotary flap door device comprising:
   a base plate mounted on the casing, a base limit part and a base engaging portion being formed on the base plate; and
   a door member, comprising:
      a door body rotably disposed on the base plate, a side of the door body being pivoted to the base plate, the door body being capable of rotating to an open position or a closed position relative to the base plate;
      a door limit part extending from the side of the door body, the door limit part being embedded in the base limit part when the door body rotates to the open position, such that the door body is fixed in the open position and defines a flow channel inside the casing cooperatively with the first data storage component; and
      a door engaging portion protruding from a surface of the door body, the door engaging portion engaging with the base engaging portion when the door body rotates to the closed position, such that the door body is fixed in the closed position and the second data storage component is adjacent to the door body.

2. The rotary flap door device of claim 1, wherein the base limit part is a constraining hole, the door limit part is a constraining protrusion, and the constraining protrusion is detachably embedded in the constraining hole.

3. The rotary flap door device of claim 2, wherein the base plate comprises an opening and a passage, the passage connected with the opening and the constraining hole, a projection area of the passage is smaller than a projection area of the opening and a projection area of the constraining hole, such that a constraining block is formed between the opening and the constraining hole on the base plate, and the constraining block is for constraining the constraining protrusion in the constraining hole.

4. The rotary flap door device of claim 1, wherein the base engaging portion is an engaging hole, the door engaging portion is an engaging post, and the engaging post detachably inserts into the engaging hole.

5. The rotary flap door device of claim 1, wherein the base plate comprises a pivotal axis, the door member further comprises a pivotal arm extending from the door body, and the pivotal arm is pivoted to the pivotal axis.

6. The rotary flap door device of claim 5, wherein an escaping breach is further formed on the base plate and located near the pivotal axis, so as to provide an escaping space that allows the pivotal arm to pivot relative to the pivotal axis.

7. The rotary flap door device of claim. 6, wherein the base limit part is a constraining hole, the pivotal arm and the door limit part are located on the same side of the door body, the pivotal arm is near the door limit part, such that the escaping breach is near the constraining hole for forming a resilient portion between the escaping breach and the constraining hole.

8. The rotary flap door device of claim 5, wherein the door body has a first side and a second side opposite to the first side, the pivotal arm and the door limit part protrude from the first side, the door engaging portion is near the second side, a taking breach is formed on the base plate and located corresponding to the second side, and the second side is exposed via the taking breach.

9. An electronic device, comprising:
   a casing selectively equipped with a first data storage component or a second data storage component, the first data storage component having a first length, the second data storage component having a second length greater than the first length; and
   a rotary flap door device installed inside the casing, comprising:
      a base plate mounted on the casing, a base limit part and a base engaging portion being formed on the base plate; and
      a door member, comprising:
         a door body rotably disposed on the base plate, a side of the door body being pivoted to the base plate, the door body being capable of rotating to an open position or a closed position relative to the base plate;
         a door limit part extending from the side of the door body, the door limit part being embedded in the base limit part when the door body rotates to the open position, such that the door body is fixed in the open position and defines a flow channel inside the casing cooperatively with the first data storage component; and
         a door engaging portion protruding from a surface of the door body, the door engaging portion engaging with the base engaging portion when the door body rotates to the closed position, such that the door body is fixed in the closed position and the second data storage component is adjacent to the door body.

10. The electronic device of claim 9, wherein the base limit part is a constraining hole, the door limit part is a constraining protrusion, and the constraining protrusion is detachably embedded in the constraining hole.

11. The electronic device of claim 10, wherein an opening and a passage are further formed on the base plate, the passage connected with the opening and the constraining hole, a projection area of the passage is smaller than a projection area of the opening and a projection area of the constraining hole, such that a constraining block is formed between the opening and the passage on the base plate, and the constraining block is for constraining the constraining protrusion in the constraining hole.

12. The electronic device of claim 9, wherein the base engaging portion is an engaging hole, the door engaging portion is an engaging post, and the engaging post detachably inserts into the engaging hole.

13. The electronic device of claim 9, wherein the base plate comprises a pivotal axis, the door member further comprises a pivotal arm extending from the door body, and the pivotal arm is pivoted to the pivotal axis.

14. The electronic device of claim 13, wherein an escaping breach is further formed on the base plate and located near the pivotal axis, so as to provide an escaping space that allows the pivotal arm to pivot relative to the pivotal axis.

15. The electronic device of claim 14, wherein the base limit part is a constraining hole, the pivotal arm and the door limit part are located on the same side of the door body, the pivotal arm is near the door limit part, such that the escaping breach is near the constraining hole for forming a resilient portion between the escaping breach and the constraining hole.

16. The electronic device of claim 13, wherein the door body has a first side and a second side opposite to the first side, the pivotal arm and the door limit part protrude from the first side, the door engaging portion is near the second side, a taking breach is formed on the base plate and located corresponding to the second side, and the second side is exposed via the taking breach.

* * * * *